Figure 1:
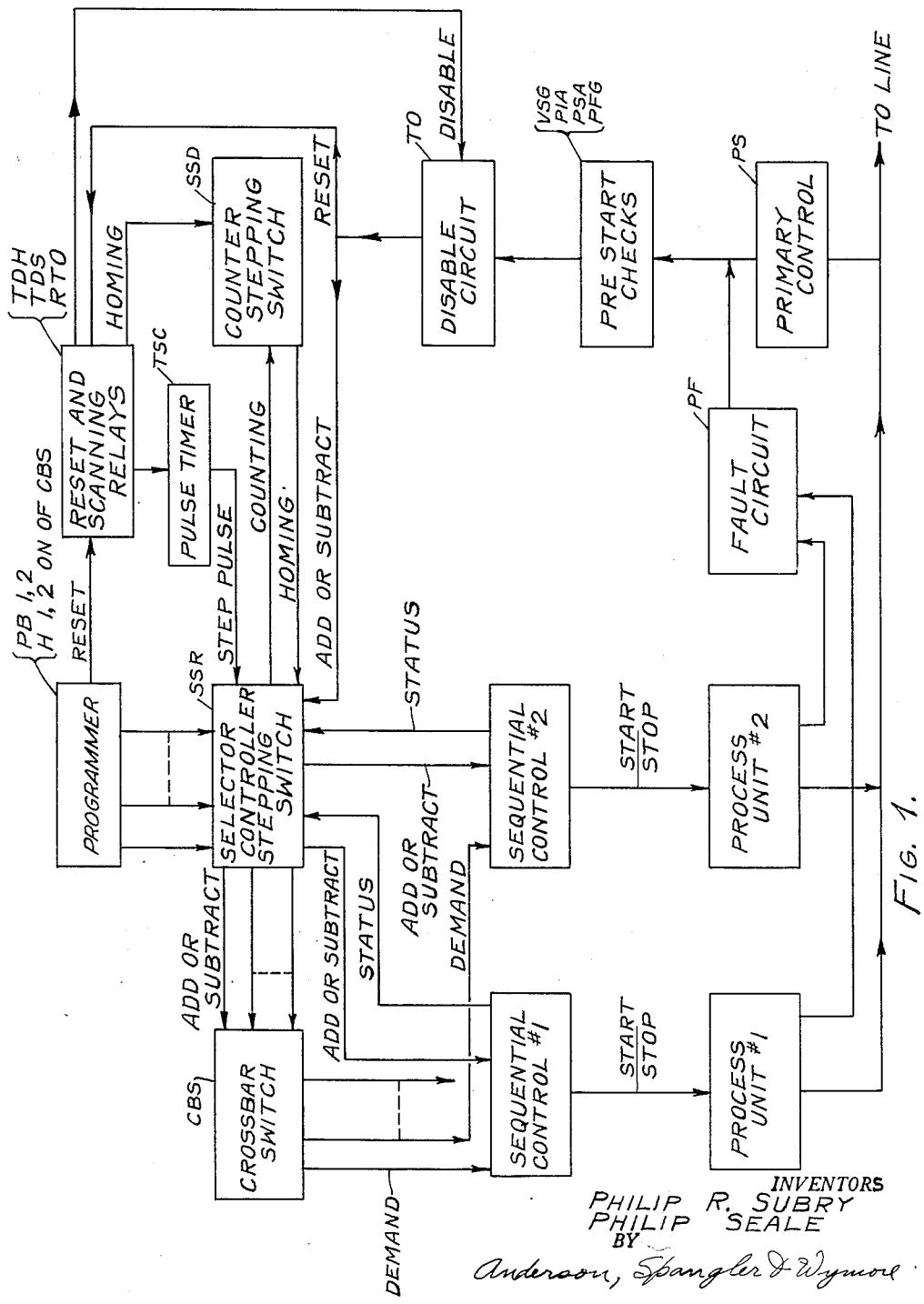

INVENTORS
PHILIP R. SUBRY
PHILIP SEALE
BY Anderson, Spangler & Wymore
ATTORNEYS

Feb. 25, 1964

P. R. SUBRY ETAL 3,122,722

PROCESS UNIT AUTOMATIC CONTROL SYSTEM

Filed Aug. 1, 1960

9 Sheets-Sheet 3

INVENTORS
PHILIP R. SUBRY
PHILIP SEALE
BY
Anderson, Spangler & Wymore
ATTORNEYS

Feb. 25, 1964 P. R. SUBRY ETAL 3,122,722
PROCESS UNIT AUTOMATIC CONTROL SYSTEM
Filed Aug. 1, 1960 9 Sheets-Sheet 6

FIG. 8.

| TC CAM DEVELOPMENT |
| SECONDS | 0 1 2 3 4 5 6 7 8 9 10 11 12 13 14 15 16 17 18 19 20 |
| CAM NO. 1 | |
| " " 2 | |
| " " 3 | |
| " " 4 | |
| " " 5 | |

FIG. 6.

INVENTORS
PHILIP R. SUBRY
PHILIP SEALE
BY
Anderson, Spangler & Wymore
ATTORNEYS

United States Patent Office 3,122,722
Patented Feb. 25, 1964

3,122,722
PROCESS UNIT AUTOMATIC CONTROL SYSTEM
Philip R. Subry, Littleton, and Philip Seale, Denver, Colo., assignors to Stearns-Roger Manufacturing Company, Denver, Colo., a corporation of Colorado
Filed Aug. 1, 1960, Ser. No. 46,788
12 Claims. (Cl. 340—152)

This invention relates to an electrical control system and more particularly to such a system for the establishment of a predetermined operating sequence in a number of similar process units, such as pumps, compressors, generators, conveyors and the like. The control system further contemplates the addition or subtraction of units according to a demand and the replacement of units, that are shut down as a result of a malfunction.

A principal object of this invention is to provide an improved control system for the control of a number of process units according to a prearranged program for the start-up or shut-down of individual units as determined by variations from a predetermined set-point and for maintaining a periodic check on the status of all units under control of the system.

A further object is to provide an improved process unit control system wherein the sequence of activation and deactivation is stored and scanned in response to a program change or a change in demand to determine the status of all units and the units to be activated or deactivated to satisfy the demand resulting from an increase or decrease in demand or a malfunction in one or more of the units being controlled.

A still further object of this invention is to provide an improved control system having a high degree of reliability utilizing components of proven capabilities requiring a minimum of supervision and maintenance.

Unit drivers controlled by the system of this invention may be electric motors, internal combustion engines, steam or gas turbines or any other conventional type of driver having an automatic start-stop control to provide the necessary control functions and the signals required by the control system.

In the unit selector of the control system of this invention a bank of illuminated pushbuttons provides for sequence programming of unit drivers. A row of numbered buttons is provided for each unit, the numbers corresponding to positions in the sequence. The total number of buttons per unit equals the total number of units in the system and, therefore, the number of possible positions in the sequence.

Electrical interlocks are provided to prevent the placing of more than one unit in a given position in the sequence. An unoccupied sequence position does not interrupt the sequence, as that position will be automatically by-passed.

Upon establishment of a sequence, it is permanently displayed by the illuminated caps of the pushbuttons. Once established, the sequence remains locked in under permanent memory, independent of electrical power until deliberately changed or electrically cleared by a fault signal from the malfunction shut-down circuit of a controlled unit.

A release pushbutton is provided for each unit for the removal of that unit from whatever position it may have occupied in the sequence.

Resequencing may be accomplished by releasing one or more units from their positions and programming them in different positions. This function is permitted at any time the control system is at rest. This is indicated by a green "permissive resequence" pilot light, with electrical interlocks preventing a unit from being placed in the sequence except when the light is on.

A malfunction shut-down occurring on any unit causes that unit to be released from the sequence and its position being by-passed. An all-plant shut-down signal will release all units and clear the pushbutton bank.

Release of a running unit from the sequence without subsequent switching its controller to "manual" will result in a shut-down of that unit after a pre-set time delay.

A unit's controller being switched to "manual" will automatically release that unit from any position occupied in the sequence and that position will be by-passed until again occupied.

Control signals from a set-point sensing device are directed through paths of the sequencing circuits in a manner to cause the units under control of the system to start successively in the order of the established sequence and to stop in reverse order.

Control signals for operation of the system may originate from any source capable of producing discrete signals representing "start" or "add" and "stop" or "subtract" demands. Control signals may be a function of pressure, flow, temperature and the like and may be taken directly from the process by means of suitable switches or from the output of an electronic or pneumatic controller.

The control signals are presented to a portion of the control system adapted to discriminate between add and subtract demands. The signal initiates a scanning program which, through the discriminating circuits, scans the status of the programmed units, and selects the appropriate unit controller to which the signal is to be delivered.

When the desired unit is located, the scanning programmer presents the control signal to the controller along with an identifying signal indicating "add" or "subtract."

When the control signal is accepted by the unit controller, an acknowledgement or status signal is transmitted to the selector, which is reset thereby, preparatory to processing the next demand.

An adjustable time delay is provided in the transmission of subsequent control signals to prevent short cycling of the units and to permit the sensing device to sense and adjust to the process changes resulting from the previously transmitted signal.

A fault replacement function is provided to immediately replace a running unit which is shut-down due to its protective devices having sensed a malfunction. The replacement unit will be the next biggest numbered stand-by unit as selected by the selector scan, since the signal received from the faulted-out unit will have the same identity as an initial "add" demand signal.

A digital counter is incorporated as a portion of the selector scanning circuit. On completion of each function of the selector or any change in the established sequence, whether due to deliberate re-sequencing or resulting from a fault signal, re-scan is initiated along with a reset of the selector. Thus, after each change is sensed, a new count of the running units is made to give a current readout.

Demand limit lock-out circuits provide for termination of cycling whenever the last unit is started or stopped when an "add" or "subtract" demand signal respectively is received. Re-sequencing or receipt of an opposite signal will reset the lock-out circuits. However, in the event that re-sequencing does not alter the status of the system, the lock-out will be reestablished on receipt of the next demand signal of the same identity.

In the event a demand signal is received and the completion of the processing thereof by the selector does not result in an acknowledgement from a unit controller or in a limit lock-out, an alarm signal is energized to indicate a lost signal.

In addition to the primary functions, the system controls auxiliary functions, such as the opening of plant and by-pass valves when the first unit is started-up after all have been in stand-by.

Additionally, incremental load control may be provided to reduce the output steps between whole units. This may be accomplished by speed control of one or more units, control of the number of capacity of compressor cylinders, control of throttling valves, dry product gates and the like or combinations thereof.

If an electronic or pneumatic controller is used to produce demand signals in accordance with the relationship of a process variable to the set-point of the sensing device, the set-point can be so modified upon stoppage of the last running unit in sequence as to prevent the starting of a unit until a new set-point is established.

Any conditions prerequisite to the starting of a unit or the plant as a whole may be monitored and if any condition is unsatisfied on receipt of a demand signal, the scanning will be prevented and a lost signal alarm will result.

Remote set-point insertion may be made by telemetry from a control center. Various information and alarm signals may be logged at the plant and/or transmitted to the control center for logging and display.

For a better understanding of the present invention, together with other and further objects thereof, reference is had to the following detailed description taken in connection with the accompanying drawings and its scope will be pointed out in the appended claims.

In the drawings:

FIGURE 1 is a block diagram of a control system according to the invention;

FIGURES 2 to 5, inclusive, comprehend a unified circuit diagram of a preferred embodiment of the control circuit according to the invention;

FIGURE 6 is a graphical representation of the timer TC cam development vs. time; and, FIGURES 7 to 10 are spindle sheets for use in side-by-side alignment with FIGURES 2 to 5 for locating the coils and contacts in FIGURES 2 to 5.

The electromagnetic switches and relays employed in the system illustrated, for which the circuits of their respective coils are shown, are designated as follows:

CBS—Crossbar switch
HL—Vertical hold latch solenoids on CBS
HR—Vertical hold release solenoids on CBS
H1–2, ON—Vertical hold off-normal switches on CBS
PS—Pressure switch
RAA—Starting control relay operated by TAA and TA
RAL—High-end sequence limit relay
RDC—D.C. failure alarm relay
RL—Load control solenoid reversing relay
RLO—Low-end sequence station lock-out relay
RLX—Load control signal directing relay
RPB—Plant by-pass control relay
RSA—Stopping control relay operated by TSA
RSL—Low-end sequence limit relay
RTO—Primary control reset relay
R1,2—In-sequence lock-out relays The designation of a coil followed by a dash and an O or R indicates respectively operate and release or reset solenoids.

S–1,2—Horizontal select solenoids on CBS
S–1,2, ON—Horizontal select off-normal switches on CBS
SSD—Running totalizing scanning stepper
SSR—Status scanning and signal directing stepper
SV—Solenoid valve, "open" and "close" coils controls loaders
TA—Engine start long time delay relay
TAA—Engine start short time delay relay
TAL—Lost signal alarm time delay relay
TC—Signal direction scanning program timer
TDS—Sequence select time delay relay
TH—Failure replacement signal holding time delay relay
TO—In-cycle lock-out time delay relay
TSC—Signal direction scanning pulser TS—Engine stop long time delay relay
TRL—Running load control time delay relay
TD1,2—Out-of-sequence shut-down time delay relay
TDR1,2—Sequence release time delay relay
TC4X—Scanning stepper homing time delay relay
TSA—Starting air limiting time delay relay
VPB—Main plant by-pass valve
VSG—Plant side gate valve
PFG—Fuel gas pressure switch
PSA—Starting air pressure switch
PIA—Instrument air pressure switch
PS—Control signal pressure switches In the wiring diagrams, identifying letters are applied to the coils of the electromagnetic switches and relays, O— for operate coils and R— for release coils, and with reference numerals appended thereto, are applied to the contacts of the switches and relays to differentiate between different sets of contacts on the same switch or relay, all contacts being shown for the unoperated condition of the switches and relays. Switches and relays of the latching type having two coils, one for operating and one for reset, are shown in reset position. Manually operated switches are designated PB1,2, PBR and SEL.

In accordance with the invention, the control system for ordered automatic control of process units to maintain a predetermined condition, to add and subtract units in accordance with a pre-arranged program and to substitute units in the event of the failure of one or more units comprises a programmer for the preselection of units to be activated and the order of activation and deactivation, a storage device adapted to receive and store program information from the programmer and status information from each process unit, a condition sensing device responsive to the condition to be maintained and adapted to develop and transmit a demand signal to the storage in accordance with a predetermined condition and a scanner arrangement for scanning the storage in response to the receipt of a demand signal from the sensing device to compare the demand signal with the program stored in the storage device from the programmer and to establish circuits through the scanner arrangement and storage device for the transmittal of an appropriate demand signal to the process unit selected by the programmer and in accordance with the signal developed by the sensing device to control the activation and deactivation of such unit.

In FIGURE 1, there is diagrammatically represented a block arrangement of the principal components of the control system of this invention. An understanding of the invention can best be gained from a description of a sequence of operations.

Assume that the plant is shut down. Process units #1 and #2 are sequentially programmed into the control by means of depressing the appropriate push button PB1 and PB2, FIGURE 3 opening contacts H1-ON and H2-ON, FIGURES 2 and 3, of selected positions of the stepper of selector controller stepping switch SSR. As each unit is programmed to establish the activation and the order of activation and de-activation thereof, the reset and scanning relays are energized, driving the selector controller and counter stepping switches SSR and SSD to home position. During the reset and scan, a disable circuit is activated which prevents a demand signal from reaching the selector controller until the programming of the particular unit is complete.

After the units are programmed, a primary control or sensing device, which may be a pressure switch PS and the like, monitors the process parameter to be controlled. When a demand signal in accordance with a predetermined set-point is transmitted from the primary control PS to the selector controller SSR via prestart checks and the disable circuit, now inactivated and adapted to pass a demand signal, either process unit #1 or process unit #2 or both subsequently will be started or added to the system in the sequence in which they have been previously programmed. The prestart checks may conveniently be a number of contacts in series, the closure of which indicates that the various prerequisites for proper starting and operation of a unit are met. The demand signal also activates the reset and scanning relays, TDH, TDS and RTO which are activated each time a unit is programmed into or out of the control and each time a demand signal is transmitted to controller SSR. The demand signal further steps SSR off of home position whereupon SSR is stepped by a pulse timer TSC through as many steps as there are units controllable by the system finally stopping at a position corresponding to the first unit programmed into SSR in stand-by condition. A signal path is thus established through the crossbar switch CBS to the sequential control for the unit programmed to be first started and a demand signal is transmitted thereto via the signal path. The selector controller SSR also transmits an appropriate identity signal to the sequential control, in this case an "add" signal which then starts the unit. A status signal is sent from the sequential control to the selector controller SSR after the unit is started and a counting signal is transmitted from the selector controller to the counter SSD which registers the unit as being in operation. When the demand signal activates the reset and scanning relays, the disable circuit is activated preventing further demand signals from the sensing device or primary control PS. After the unit is in operation and the lapse of a predetermined time period, the disable circuit is deactivated to permit the transmission of further demand signals to the selector controller as initiated by primary control PS.

Each time an "add" or "subtract" demand signal is received by selector controller SSR, the reset and control sequences are repeated, starting the next available unit or stopping the last started unit in accordance with the findings of the primary control. In the event a unit is not programmed or is shut down, that unit will be by-passed on receipt of the next demand signal, until the unit is programmed or in stand-by condition. If a malfunction occurs in a unit, a fault circuit is activated which transmits a demand "add" signal if not nullified by the primary control. When a unit is shut down manually, a demand "add" signal is generated to bring on a replacement stand-by unit.

FIGURE 1, as described above, will be recognized as a schematic outline of the essential components of a complete control system for the automatic control of two or more conditions in response to an internal and/or external parameter of the system being controlled. In order to fully understand the details of such a system, as well as the cooperation between and the function of the related parts, a description of the circuit arrangement spread over FIGURES 2 to 5, inclusive, directed to the selector controller circuits will be made. This circuit arrangement is in conformity with that shown in FIGURE 1 and does not represent an alternative embodiment.

While the detailed description of FIGURES 2 to 5, inclusive, may include references to certain components as though their utilization might be restricted to a system for controlling engines driving air-compressors, it should be understood that the embodiment of the instant invention herein shown and described has a much wider range of usefulness, and the control of compressor units is merely referred to by way of illustration.

In order to avoid unduly complicating the drawings, the invention will be illustrated as controlling a total of two units, although it is to be understood that the provision for controlling a greater number requires only a duplication of certain portions of the common circuit. In FIGURES 2 to 5, all contacts are shown in the de-energized position and the wiring shown in dotted lines is external of the circuit depicted by that figure. FIGURES 2 to 5 are seen to encompass only the selector controller circuits. The sequential controllers and local engine controllers not being shown in detail.

Where two units, each comprising an engine driving a compressor, are to be automatically controlled, they will be programmed into the control system in the order they are to be put into or taken out of operation. The program sequence is set into the crossbar switch CBS Level 5 by depressing an appropriate pushbutton. For example, pushbutton PB1-1, FIGURE 3, programs unit 1 into the first position in the sequence. On depressing pushbutton PB1-1, a circuit is completed from the positive bus bar B+ through a normally closed contact RAA-2 of relay RAA, normally closed contact RSA-2 of relay RSA, normally closed contact SEL-5-1 of selector switch SEL of unit 1 engine panel and a normally closed contact R1-3 of relay R1 through a first set of contacts of pushbutton PB1-1 through solenoid S1 to the negative bus bar B—. Actuation of solenoid S1 closes normally open contact S1-2 and completes the circuit from the positive bus bar B+ therethrough and through the second set of contacts of pushbutton PB-1 through solenoid HL1 to the negative bus bar B—. Actuation of solenoid HL1 causes normally closed contact H1-ON on stepping switch SSR Levels 3 and 4 connected respectively to the vertical bank 1 of crossbar switch CBS Levels 4 and 5, to be opened, FIGURE 2. Further the activation of solenoid HL1 latches the first vertical hold of the crossbar switch CBS and the actuation of solenoid S1 selects the upper horizontal contact completing a circuit from B+ through the first vertical, first horizontal contact of Level 3 of crossbar switch CBS through lamp PBL1-1 to B—. The illumination of lamp PBL1-1 indicates unit #1 as being programmed into position number one. Similarly, depressing PB2-2 programs unit #2 in position two and lamp PBL2-2 is illuminated. When solenoid S1 is energized by depressing pushbutton PB1-1, a second normally open contact S1-1, FIGURE 1, is momentarily closed energizing scanning and reset relays TDH, TDS and RTO with relay TO being energized through a contact RTO-1 on relay TO in series therewith, to assure pre-energization of relay TO.

The scanning and reset relays, above enumerated, are set into motion each time any control or programming function is completed, such as programming in of a unit. The selector controller and counter stepping switches SSR and SSD are homed, SSR then SSD. When relay TDS is energized, the normally open TDS-1 contact in series with the normally open on home position contact SSD-On is closed and energizes the stepper of SSD to home position. At the same time that the normally open TDS-1 contact is closed, energy is supplied therethrough and through normally closed contact TC4X-1 of timer switch TC4X and the normally closed on home contact SSD-3 on counter SSD to normally open on home contact SSR-1 and energizes the stepper of selector controller SSR to the home position. Relay TDS will be released after a time delay closing the normally closed TDS-2 contact and normally open contact TO-1 will still be closed, supplying energy to pulse timer TSC, which supplies a pulse of energy to the stepper of selector controller SSR through contact TSC-3, driving same from the home position to position one. Controller SSR is the control scanner, and has a dual function. After reaching position one, the stepper of controller SSR sweeps to position three under impulse control of the pulse timer TSC. The first two positions of level 1 of controller SSR are connected to contacts SSC-15 in the sequential controllers, FIGURE 1, which are closed only when an engine under the control thereof has been placed in operation. As each running signal is passed by selector controller SSR, counter SSD is pulsed and registers a count through TSC-1. Thus, counter SSD is a digital counter, indicating the total number of engines actually in operation. The second function of selector controller SSR is to scan for the appropriate sequential controller to receive a start or stop signal from a primary control. When a unit is in the condition sought by the scanner, the respective H1,2,—ON contacts present an open circuit. The selector controller SSR scans numerically up, on the stand-by signals and down, on the running signals.

When the first open circuit is reached, the stepper of SSR will stop, selecting either the lowest numbered standby unit to start, or the highest numbered unit to stop, depending on whether an "add" or "subtract" demand signal is received from the primary control PS.

The demand signal is subsequently routed through the program path within the cross bar switch CBS, to the selected sequence control panel, FIGURE 1, when the scanning and signal directing process is completed. Upon receipt of a demand signal by a sequence control panel, an acknowledgement signal, in the form of a contact closure, energizes the reset bus, FIGURE 2, reset and scanning relays TDH, RTO, TO and TDS, and maintains the bus energized until the function required has been completed. The contact then opens, de-energizing the reset bus, and after a time delay, the primary control is activated, permitting the production of another control signal. The counter stepper SSD presents to the primary control digitally the number of units running. Upon receipt of an "add" signal, or no units are running, the start signal is sent to the first unit immediately. If one or more units are running, an adjustable time delay TA, FIGURE 4, must elapse before the start signal is presented to the next sequential control panel, FIGURE 1. An adjustable time delay TS, FIGURE 4, is always applied to a "subtract" signal.

Figure 4:
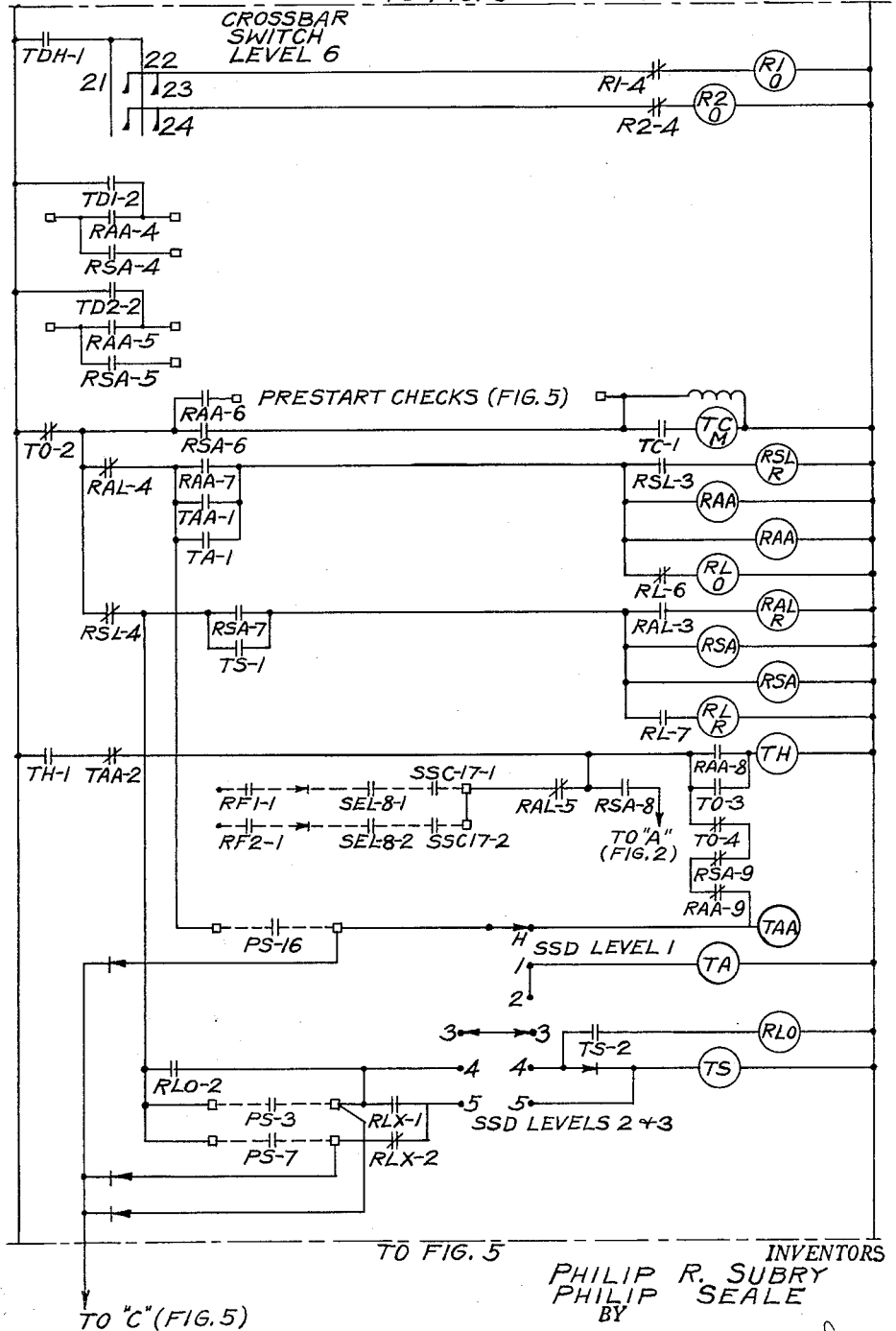

The "add" and "subtract" signals, after the elapse of the time delay, energize their respective auxiliary relays, RAA or RSA, FIGURE 4. These relays perform principally the function of selecting the proper paths through the scanning system for signal direction, and also start the scanning program timer TC, FIGURE 4.

Figure 2:
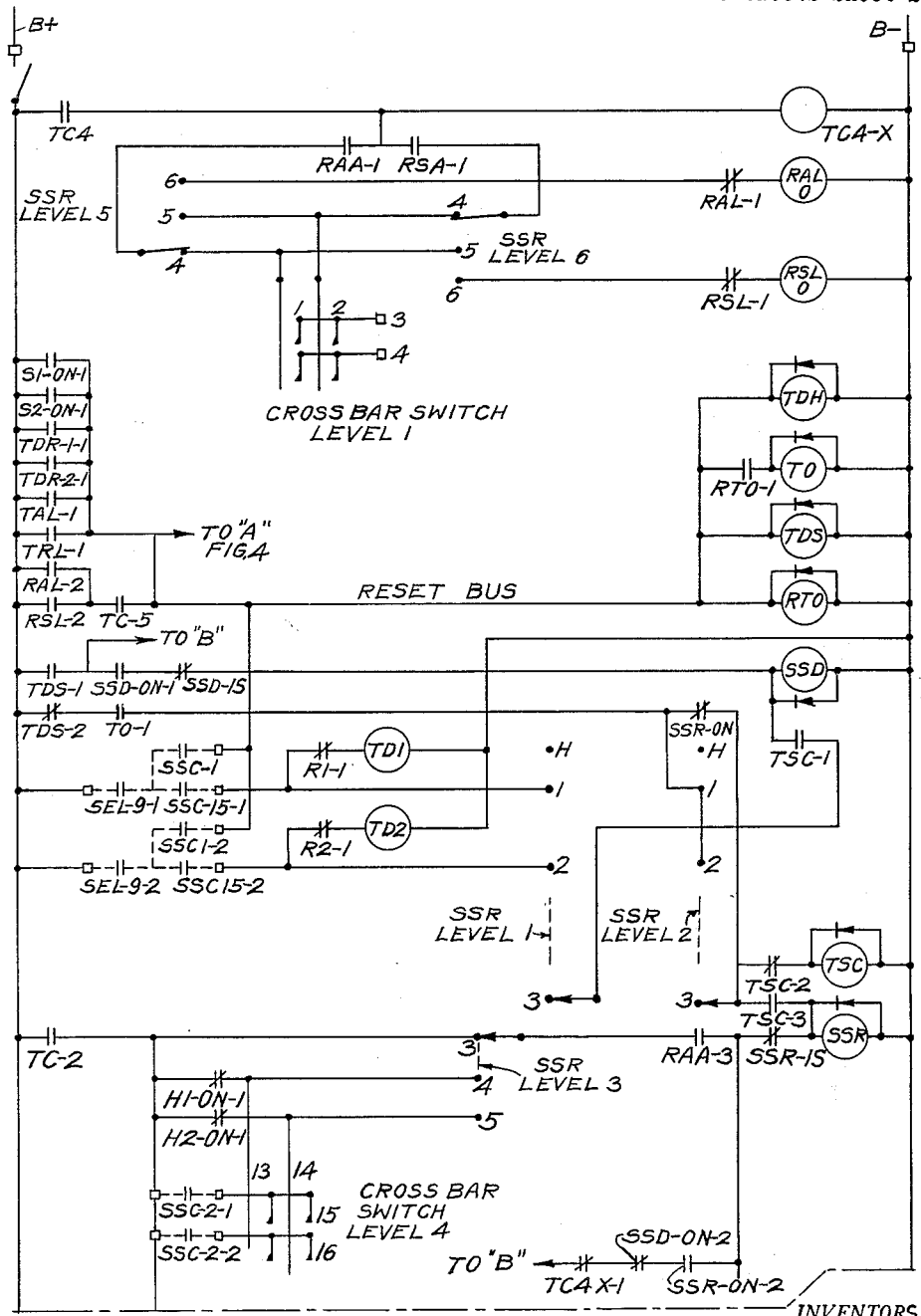
Figure 3:
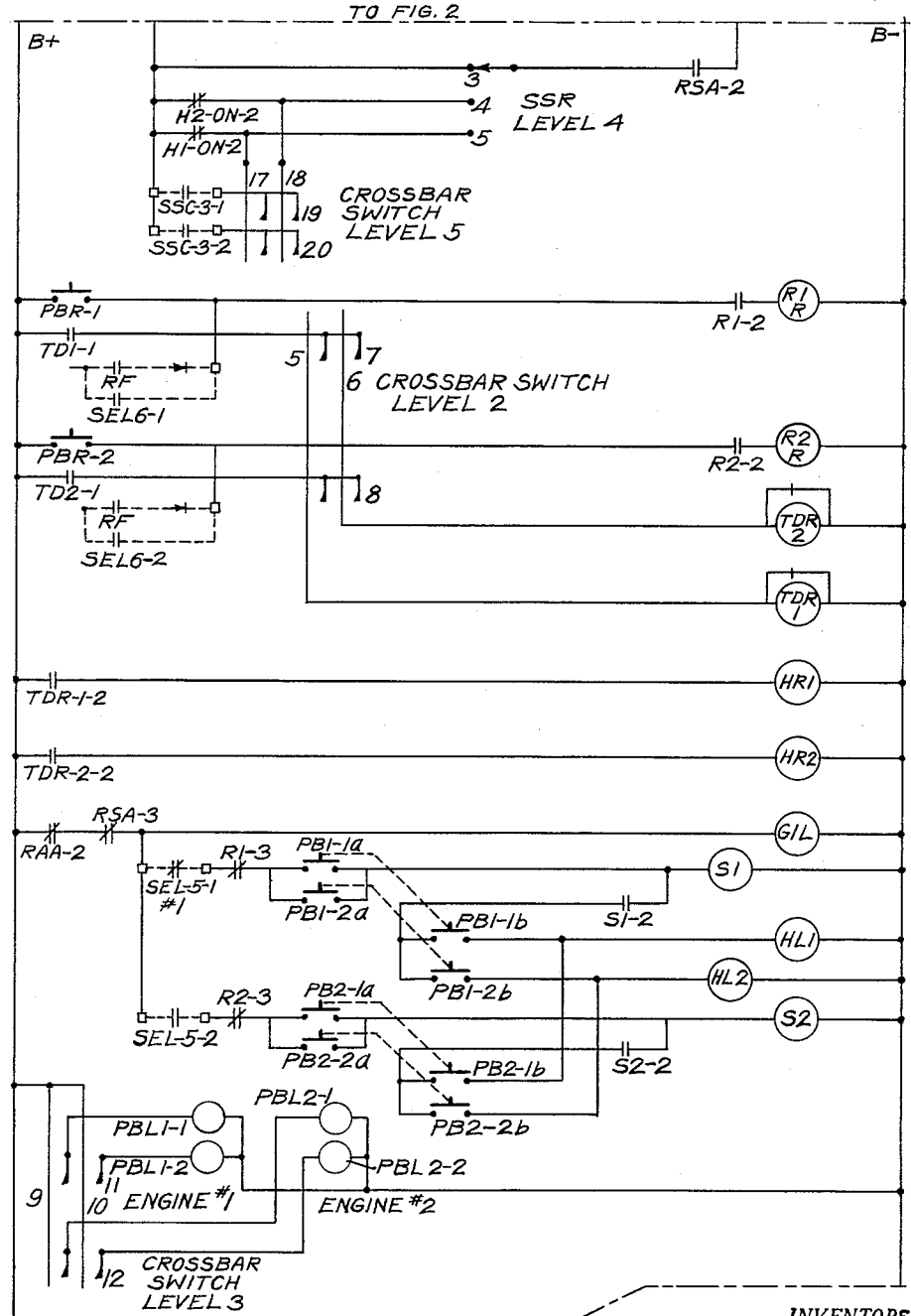
Figure 5:
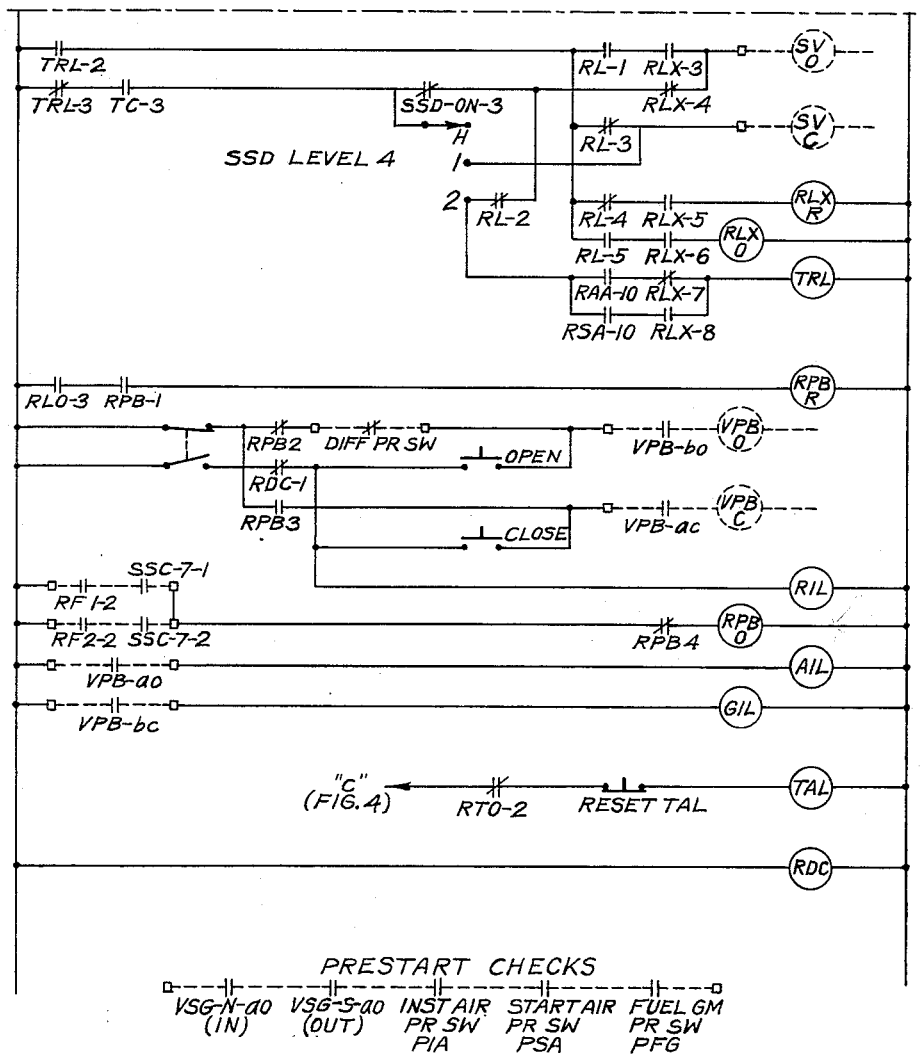
Figure 7:
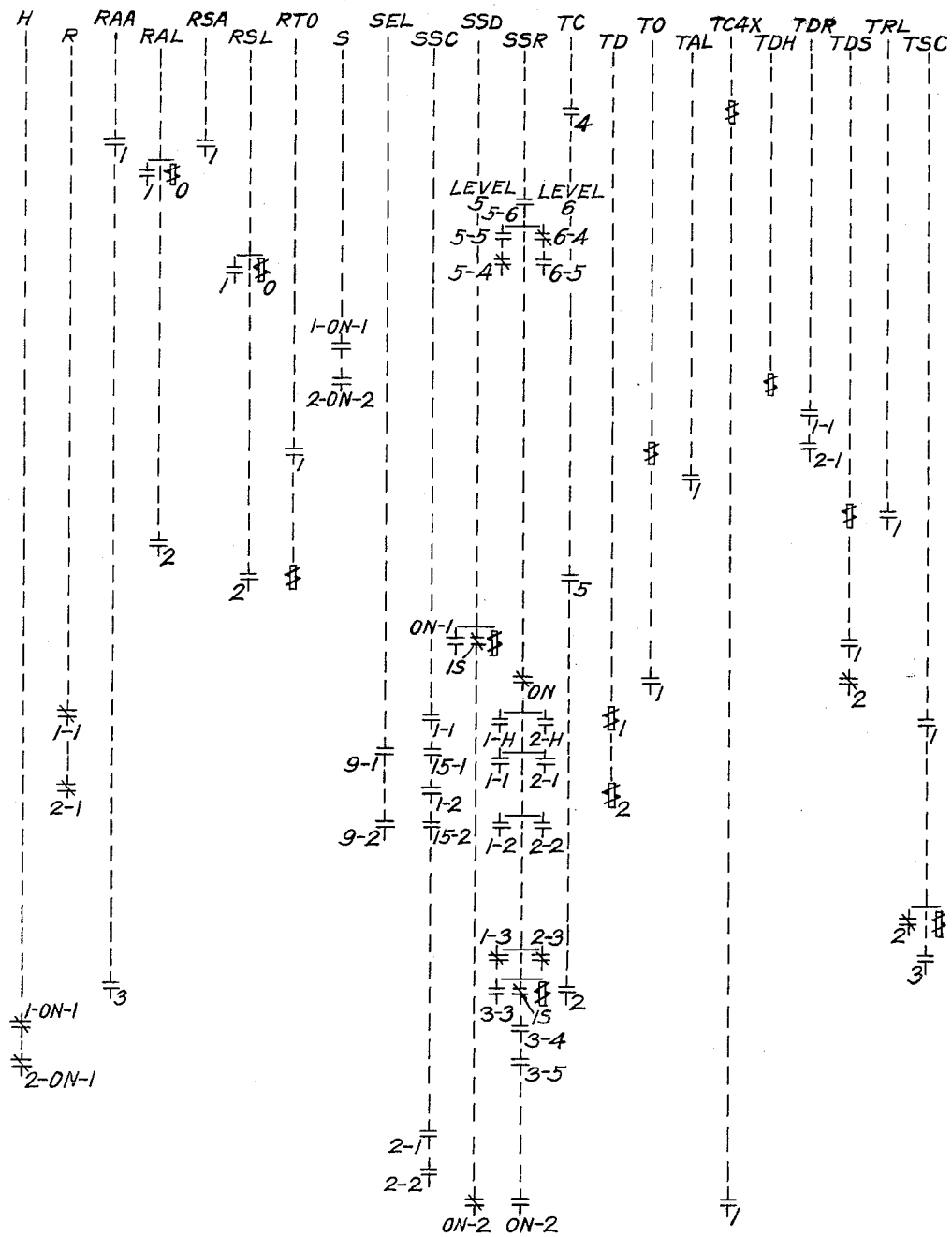
Figure 9:
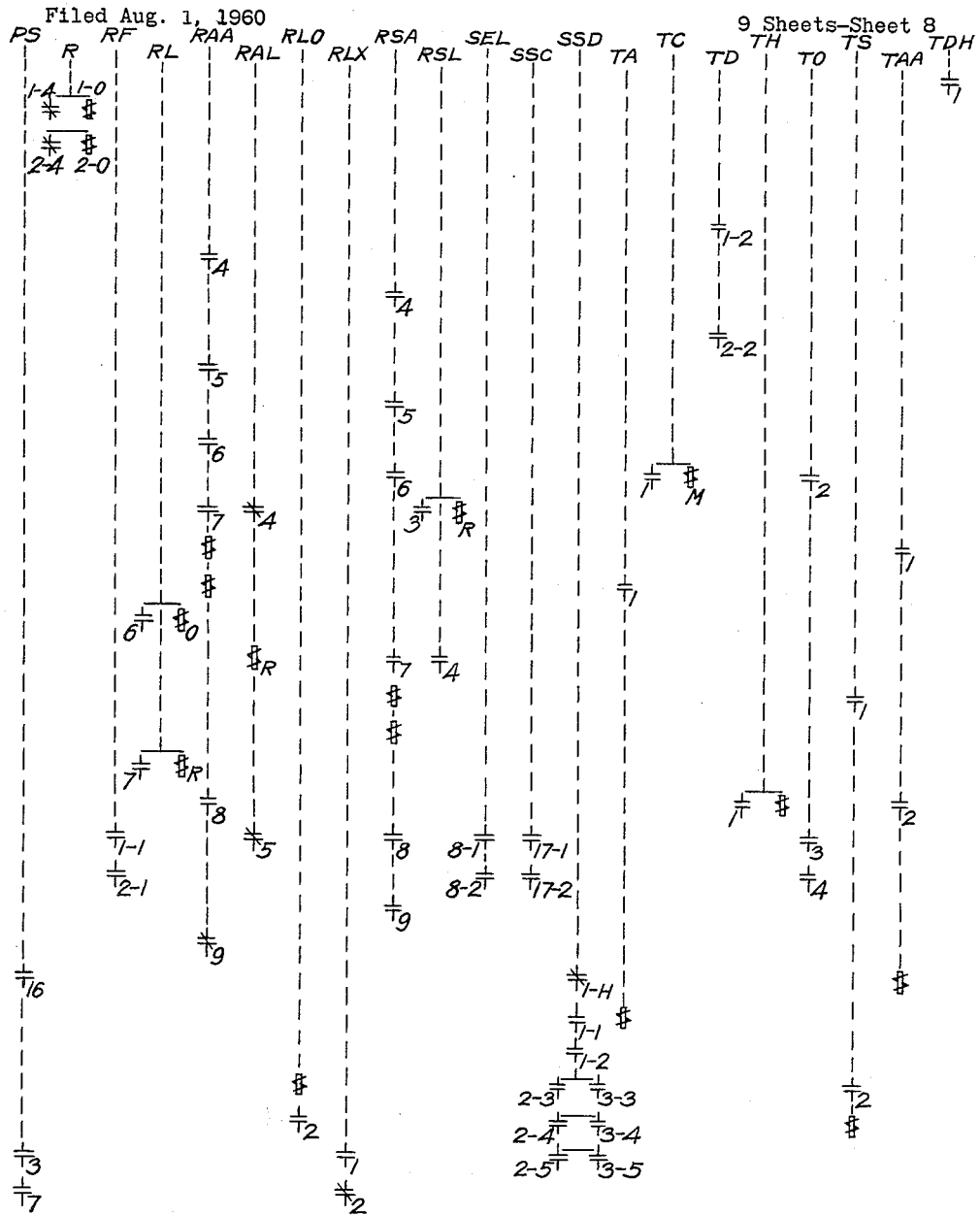
Figure 10:
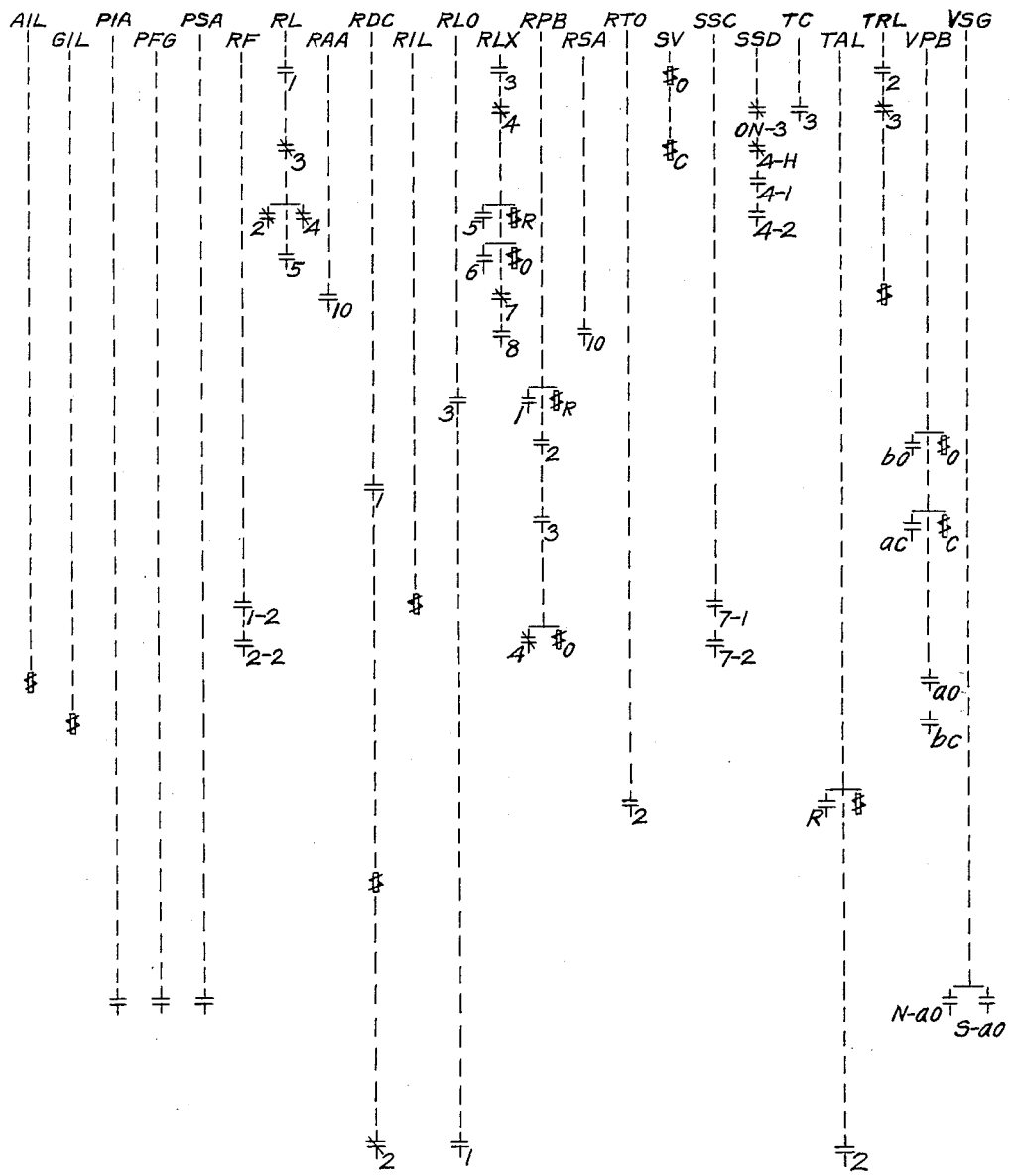

The timer TC programs in sequence the unit status scanning TC–2, FIGURE 2, in the case of compressors the cylinder loading control TC–3, FIGURE 5, signal to sequence control panels TC–4, FIGURE 2, and finally the limit reset TC–5, FIGURE 2. Timer TC may not be started by an "add" signal unless all conditions pertinent to the proper functioning of the process units are correct as verified by the prestart checks, FIGURES 1 and 4. The operation and mode of TC is shown graphically in FIGURE 6.

Cylinder loading may be provided in a compressor control system for incremental control of the plant output during periods of low demand. This control is operative only when one or two compressors are running. Above two compressors all are fully loaded. Cylinder loading is controlled by applying control air pressure to valve lifters by opening solenoid valve SV–O, FIGURE 5. This function is controlled by two switch levels of counter SSD, a relay network of RL and RLX and time delay relay TRL. Level 4 of SSD along with timer contact TC–3, FIGURE 5, controls the switching of the solenoid valve SV–O and levels 2 and 3, FIGURE 4, select the proper subtract pressure switch to satisfy the compressor loading curves. The cylinder loading represents only a portion of the compressor capacity and the add operational sequence is as follows:

(1) One compressor running fully loaded.
(2) Two compressors running partially loaded.
(3) Two compressors running fully loaded.
(4) Remaining compressors come on fully loaded.

The units are subtracted essentially in reverse order.

When all compressors are running and another "add" signal is received, add limit relay RAL, FIGURE 2, is energized. This locks in and prevents additional add signals from recycling the control. This lockout is removed by a receipt of a subtract signal resetting RAL, RAL–R, FIGURE 4. When a limit has been reached, timer contact TC–S in series with a contact RAL–1, FIGURE 2, of the limit relay energizes the reset bus to prepare the primary control for receipt of a subtract signal.

When a "subtract" signal is received to stop the last operating compressor, a plant lock-out relay RLO, FIGURE 4, is operated. Relay RLO provides a signal to the plant discharge PRC, not shown, to drive the set-point to zero. The plant cannot restart automatically until a new set-point is established either manually at the plant or by remote control by a dispatcher.

When the final "subtract" signal operates RLO, a control relay RPB, FIGURE 5, for the control of the plant block valve is also operated. This prepares a circuit which is completed when a differential pressure switch DPS connected across the block valve, not shown, indicates the absence of a differential by closing a contact, FIGURE 5. This completed circuit opens the plant block valve by energizing VPB–O, FIGURE 5. Paralleled contacts from all sequence panels provide a contact closure RPB–B when the first on-coming compressor comes under load control. This contact closure resets relay RPB causing the plant block valve to close by energizing VPB–C.

A fault replacement control is provided to shut down a running or on-coming unit where the protective devices have detected a malfunction. The fault relay RF on the particular sequential control panel closes, sending a replacement signal to the selector controller through SEL 8, shown dotted FIGURE 4. If the selector is at reset, the signal is fed through closed contacts RAL–5, TO–4, RAA–9 and RSA–9 to relay TAA, FIGURE 4. Relay TAA responds as though energized through PS–16 by the primary control and transmits an "add" signal to the processing circuits, starting the next available engine.

If a "subtract" signal is being processed, an opened contact RSA–9 of relay RSA prevents the replacement signal from reaching TAA. A closed contact RSA–8 directs the replacement signal to the reset bus, FIG. 2, which resets the primary control preventing TC–4 from closing to subtract another running unit.

If an "add" signal is in process opened contacts RAA–9 and/or TO–4 prevent the replacement signal from reaching relay TAA. Closed contacts RAA–8 and/or TO–3 direct the replacement to holding timer TH. Timer TH locks in through its contact TH–1 and contact TAA–2. Upon re-energizing of the primary control after the time-out of TO subsequent to the recount of unit status, a circuit is completed to relay TAA through contacts TH–1, TAA–2, TO–4, RSA–9 and RAA–9. Relay TAA is actuated as though having received a signal from the primary control through PS–16, FIGURE 4, initiating the processing of an "add" signal which, in effect, transforms the replacement signal held by timer TH into a delayed "add" signal. Opening of contact TAA–2 de-energizes and resets timer TH, clearing the replacement circuit. Completion of the processing of the signal results in the starting of the next available unit as a replacement of the faulted unit, or the operation of the "add" lockout circuit.

A timer TAL, FIGURE 5, is energized by the closing of either of the pressure switches which initiate the "add" or "subtract" signals in the primary control. If a signal is lost or delivered to a sequence control panel as an incorrect address, no acknowledgement signal will be received and timer TAL will time out. On timing out, TAL delivers an alarm signal to the alarm through contact TAL–2, FIGURE 5, and to the reset bus through contact TAL–1, FIGURE 2, indicating a malfunction in the signal paths.

If the sequence control panel of an operating unit is removed from the program sequence and is not transferred to manual control at the sequence control panel, a time delay relay TD1, TD2, etc., for that unit is permitted to time out, closing a contact TD1–2, TD2–2, etc., transmitting a "subtract" signal to the sequential control panel for that unit. At the same time, contact TD1–1, TD2–2, etc., closes energizing the respective relay TDR–1 or TDR–2 through contacts of level 2 of cross bar switch CBS. Contact TDR–1–1 or TDR–2–1 is closed sending a signal to the reset bus. Vertical hold release HR1, 2 on the cross bar switch is actuated through contacts TDR-1-2 or TDR-2-2, removing that unit from the program.

EXAMPLE OF OPERATING TWO COMPRESSORS

It will be assumed that the plant is shut down with all conditions normal and units one and two are programmed into program positions one and two respectively. The discharge set-point is below line pressure, scanning stepper SSR is on position three and counting stepper SSD is on "home" position indicating a zero count of engines running.

1. Line Pressure Drops Below Set Point, Start Engine

A

Contact PS-16 closes, indicating demand for plant output ("add" signal).

Short delay "add" timer TAA and in complete sequence alarm timer are energized from the positive bus through normally closed contacts TO-2, RAL-4 and closed contact PS-16.

Contact TAA-1 energizes "add" relay RAA through closed contacts TO-2 and RAL-4.

"Subtract" limit relay RSL is reset through contact RSL-3.

"Add" relay RAA locks in through contact RAA-9.

Contact RAA-8 energizes program timer TC through closed contacts of the prestart checks and TO-2.

B

Contact TC-1 is the internal motor interlock contact of TC. TC-1 closes, starting timer TC.

Contacts TC-2 and TC-3 close after a three second delay (see FIGURE 6).

Contact TC-3 energizes solenoid valve SV-O through closed contacts TRL-3, SSD-ON-3 and RLX-4.

Solenoid valve SV-O removes unloading air from header, causing all unloaders to close.

Contact TC-2 energizes scanning stepper SSR through contact RAA-3 and SSR-15, interrupter switch of SSR.

Stepper SSR moves to position three. Since position one in the sequence is occupied by engine #1, the H1-ON (off-normal) contact of the cross bar switch CBS is now open.

Engine #1 is not running, therefore, contact SSC-2-1 of the #1 sequence controller stepper SSC is open (shown dotted as being located external of the selector circuit).

Contacts H1-ON and SSC-2-1 are in parallel and present an open circuit to scanning stepper SSR in position three, therefore, it cannot proceed beyond that point.

C

Contact TC-4 of timer TC closes, after seven seconds, completing a circuit through contact RAA-1, SSR level 5, position 4 and contact 1-3 of CBS, level 1 to the output terminal which is connected to the sequence panel of the #1 engine.

The #1 engine is thus started under load.

2. Preparation of Selector To Process an Additional Signal

A

As sequence control of the #1 engine receives and accepts the "add" signal, its stepper SSC starts through the starting program. In position two, contacts SSC-1-1 and SSC-2-1 are closed. Contact SSC-2-1 remains closed in all positions except stand-by position. SSC-1-1 remains closed through position nine. During the time in which SSC-H is closed, relay RTO and timers TDH, TDS and TO are energized continuously. The operation of relay TDH has no effect at this time.

B

Opening of normally closed contact TO-2, deenergizes the entire primary control portion of the system, including timer TC, and relays RAA, TAA and TAC.

Another normally closed contact TO-4 opens to prevent instantaneous operation of the fault replacement function, while a normally open contact TO-3 closes to direct any incoming fault replacement signal to timer TH.

Closing of contact TDS-1 energizes counter stepper SSD through its off-normal and interrupter contacts, SSD-ON-1 and SSD-15, causing SSD to step, self-interrupted to home where contact SSD-ON-1 opens.

With contact TC-4 open, due to timer TC being reset, inhibiting relay TC-4X is de-energized, completing a circuit to scanning stepper SSR through contacts TDS-1, TC4X-1, SSD-ON-2 and SSR-15, homing scanning stepper SSR.

C

When the #1 sequence control SSC reaches position three (engine running), contacts SSC-1-1 and SSC-3-1 are opened and SSC-2-1 and SSC-15-1 are closed.

Opening SSC-1-1 de-energizes relays RTO, TDS and TO. After TDS times out (two seconds) and prior to the timing out of TO (ten seconds), a circuit is completed through contacts TDS-2, TO-1 and SSR-On-1 to scanning timer TSC through its normally closed contact TSC-2. Timer TSC produces a pulse which is sent to scanning stepper SSR through contact TSC-3.

Scanning stepper SSR moves to position one.

The circuit to timer TSC is transferred from contact SSR-On-1 to the wiper and bank contacts of SSR level 2.

Timer TSC continues to pulse and step scanning stepper SSR until step position 3 is reached, at which time the circuit of level 2 of SSR is opened and the stepping stops. While the wiper of SSR, level 1 is on position one, a circuit is completed to counting stepper SSD through that contact, and contacts SEL 9, SSC-15-1 and TSC-1 causing SSD to move to position one, thus retaining a count of one unit operating.

3. Starting of Second Unit

A

Timing-out of timer TO (ten seconds) re-energizes the primary control circuits by the closure of contact TO-2, allowing another signal to be originated by a continued or subsequent closure of PS-16.

The next signal from PS-16 is directed to the "add" time delay relay TA through position one of level 1 of counting stepper SSD. Upon expiration of the time delay of TA, contact TA-1 energizes timer TC and relay RAA through TO-2, RAL-4 and TA-1 energizing relay RAA. Closure of RAA-8 energizes TC through the prestart checks.

B

Closure of contact TC-3 energizes solenoid SV-C through contact TRL-2 and position one, level 4 of counter stepper SSD, applying air to the unloader header, which removes the load from the running #1 unit. The #2 unit will also start unloaded.

Timer contact TC-2 and RAA-3 energize scanning stepper SSR to move to position four.

Since SSC-2-1 of sequence panel #1 is now closed, the circuit is completed through cross bar switch CBS contacts 13-15 of level 4 to SSR position 4 of level 3.

Scanning stepper SSR is pulsed to position five, where it encounters an open circuit and stops.

C

As TC-4 contact closes, a circuit is completed through contact RAA-1, scanning stepper SSR position five of level 5 and cross bar switch CBS level 1 to output terminal 4, presenting a start signal to sequence panel #2.

It will be appreciated that while energization of an output of level 1 of CBS indicates a demand to the sequence panels, this may be an "add" or a "subtract" demand, however, relay RAA is energized on an "add" and relay RSA is energized on a "subtract." Contacts RAA-4 and RAA-5, and RSA-4 and RSA-5 transmit an identity signal to the sequence panel to order the addition or subtraction of a unit in accordance with the requirements of the primary control.

Unit #2 is now started. The preparation of the selector to process additional signals follows as for the starting of engine #1 except that two SSC-15 contacts are now closed so counting stepper SSD will register a count of two engines running and will rest on position two.

Additional engines may be controlled and started in a similar manner with the control circuitry following successively parallel paths.

The processing of the next "add" signal will be similar except that relay RLX-O will be energized through the closure of contact RL-5 as a result of relay RL being energized through RAA-7 and RL-6. Relay TRL will be energized with the closure of TC-3 through RAA-10, closing TRL-1 and TRL-2. Solenoid SV-O is energized through TRL-2, RL-1 and RLX-3, removing loading air from the header, fully loading both running engines. Closure of TRL-1 energizes the reset bus before TC-4 can close preventing a start signal from reaching unit #3. The next "add" signal will start unit #3 fully loaded.

*4. Line Pressure Exceeds Set Point of PRC While Two Engines Are Running Unloaded*

A

Contact PS-7 closes indicating a demand for reduction of plant output, i.e., "subtract" signal.

"Subtract" timer TS is energized through contact RLX-2 and position two, levels 2 and 3 of counter stepper SSD.

Upon time-out of timer TS contact TS-1 energizes "subtract" relays RSA through contacts TO-2 and RSL-4. Relay RSA locks-in through contact RSA-7. Timer TC is energized through the closure of RSA-6 through contact TO-2.

B

Contacts TC-2 and TC-3 close.

Contact TC-3 closes, energizing solenoid SV-O through contacts TRL-3, position two, level 4 of SSD, RL-2 and RLX-4.

This removes loading air from the header so that the remaining engine will run loaded.

Timer contact TC-2 energizes scanning stepper SSR through RSA-3 and SSR-15 (interrupter switch).

Since position four of level 4 of SSR is occupied cross bar switch CBS off-normal contact H2-ON is open and presents an open circuit to SSR, SSR stops on position four.

C

Timer contact TC-4 closes, completing a circuit through contact RSA-1, position 4 of SSR, level 6, and CBS, level 1 to output terminal 4. This presents a demand signal to the sequence panel and an identification of the demand as "subtract" is supplied thereto through the closed RSA-5 contact.

Unit #2 is stopped leaving unit #1 running fully loaded.

D

Reset, recount and preparation for processing of additional demand signals proceeds as previously described under section 2 with counting stepper SSD stopping on position one, indicating one unit running.

*5. Shutdown of Remaining Unit*

A

Closure of PS-3 of the primary control originates another "subtract" signal which energizes TS through position one of counter stepper SSD, levels 2 and 3 and a blocking diode.

Upon expiration of the time delay of TS, closure of contact TS-1 energizes relay RLO, producing a plant lockout signal. Timer TC and relay RSA are energized as set forth under section 4a.

B

Closure of contact TC-3 energizes solenoid SV-C through contact TRL-3, and position one, level 4 of SSD applying unloading air to the header, unloading running unit #1.

Closure of contact TC-2 energizes scanning stepper SSR through contact RSA-3 and the scanning progresses as in section 4b.

At this time contact SSC-3-2 of sequence panel #2 is closed so SSR proceeds to and stops on position 5 of level 4 corresponding to the position of unit #1.

C

TC-4 closes completing a circuit through RSA-1, SSR position 5, level 6, CBS level 1 to output terminal 3, which sends a demand signal to sequence panel #1, while RSA-4 transmits a signal to the panel identifying the demand as a "subtract" signal.

All units are now in stand-by with the plant locked out by the minimum set-point of PRC.

As changes can be made in the above described construction and many apparently different embodiments of this invention can be made without departing from the scope thereof, it is intended that all matter contained in the above description or shown on the accompanying drawings be interpreted as illustrative only and not in a limiting sense.

We claim:

1. A control system for the ordered automatic control of process units to maintain a predetermined condition, to add and subtract units in accordance with a prearranged program and to substitute units in the event of the failure of one or more units comprising a programming means for the preselection of units to be activated and the order of activation and deactivation, storage means adapted to receive and store program information from said programming means and status information from each process unit, sensing means responsive to the condition to be maintained and adapted to develop and transmit a demand signal to said storage means in accordance with a predetermined condition and means for scanning said storage means in response to the receipt of a demand signal from the sensing device to compare the demand signal with the program stored in the storage means from said programming means and to establish circuits through said scanning and storage means for the transmittal of an appropriate demand signal to the process unit selected by the programmer and in accordance with the signal developed by the sensing means to control the activation and deactivation of such unit.

2. A control system as set forth in claim 1 including disable means adapted to receive the demand signal from the sensing means and transmit same to the scanning means which disable means is actuated when the scanning means is actuated to prevent further demand signals from being received by the storage means until a scan function is completed.

3. A control system according to claim 2, wherein the scanning means is actuated by the insertion of programming information into the storage means by the programmer means, actuating the disable means to prevent the receipt of a demand signal by the storage means until a programming function is completed.

4. A control system according to claim 2, including circuit means responsive to the failure of an operating unit adapted to transmit a replacement demand signal to the storage means on the failure of an operating unit.

5. A control system for the ordered automatic control of a plurality of process units to maintain a predetermined condition, to add and subtract units in accordance with a prearranged program and to substitute in the event of the failure of one or more units comprising programming means for the preselection of units to be activated and the order of activation and deactivation including a set of switch contacts for each unit numbering up to the number of units controlled, the closure of one contact of a set preventing the closure of any other contact of that set and the closure of a corresponding contact of any other set, storage means adapted to receive and store program information from said programming means as well as status information from each process unit, sensing means responsive to the condition to be maintained and adapted to develop and transmit a demand signal in accordance with a predetermined variation from a preset condition and means for scanning said storage means in response to the receipt of a demand signal from the sensing device to compare the demand signal with the program stored in the storage means from said programming means and to establish circuits through said scanning and storage means for the transmittal of an appropriate demand signal to the process unit selected by the programmer and in accordance with the signal developed by the sensing means to control the activation and deactivation of such unit.

6. A control system as set forth in claim 5 including disable means adapted to receive a demand signal from the sensing means and transmit same to the scanning means which disable means is actuated on actuation of the scanning means to prevent further demand signals from being received by the storage means until the scan function is completed.

7. A control system according to claim 6, wherein the scanning means is actuated with the insertion of program information into the storage means by the programmer means, actuating the disable means to prevent the receipt of a demand signal by the storage means until the programming function is completed.

8. A control system according to claim 6, including circuit means responsive to the failure of an operating process unit adapted to develop and transmit a replacement demand signal to the storage means on failure of an operation unit.

9. A control system for the ordered automatic control of a plurality of process units to maintain a predetermined condition, to add and subtract units in accordance with a prearranged program and to substitute in the event of the failure of one or more units which comprises programming means for the preselection of units to be activated and the order of activation and deactivation including a set of switch contacts for each unit numbering up to the number of units controlled, the closure of one contact of a set preventing the closure of any other contact of that set and the closure of a corresponding contact of any other set, storage means adapted to receive and store program information from said programming means as well as status information from each process unit including a crossbar switch having contacts responsive to the program information which are actuated to establish a program path therethrough in accordance with the program information supplied thereto, sensing means responsive to a condition to be maintained and adapted to develop a demand signal in accordance with a predetermined variation from a preset condition and means for scanning said storage means in response to the receipt thereby of a demand signal from the sensing means to locate and establish circuits through said scanning and said storage means for the transmittal of an appropriate demand signal to the process unit selected by the programmer and in accordance with the signal developed by the sensing means to control the activation and deactivation of such unit.

10. A control system as set forth in claim 9 including disable means adapted to receive a demand signal from the sensing means and transmit same to the scanning means which disable means is actuated on actuation of the scanning means to prevent further demand signals from being received by the storage means until the scan function is completed.

11. A control system according to claim 10, wherein the scanning means is actuated with the insertion of program information into the storage means by the programmer means, actuating the disable means to prevent receipt of a demand signal by the storage means until the programming function is completed.

12. A control system according to claim 10, including circuit means responsive to the failure of an operating process unit adapted to develop and transmit a replacement demand signal to the storage means on failure of an operating unit.

References Cited in the file of this patent

UNITED STATES PATENTS

| | | |
|---|---|---|
| 2,202,392 | May et al. | May 28, 1940 |
| 2,719,284 | Roberts et al. | Sept. 27, 1955 |
| 2,986,723 | Darwin et al. | May 30, 1961 |